(12) United States Patent
An et al.

(10) Patent No.: US 7,980,929 B2
(45) Date of Patent: Jul. 19, 2011

(54) INSTRUMENT PANEL VENT

(75) Inventors: Chae H. An, Northville, MI (US);
Stefan Young, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 409 days.

(21) Appl. No.: 11/671,850

(22) Filed: Feb. 6, 2007

(65) Prior Publication Data

US 2008/0188171 A1 Aug. 7, 2008

(51) Int. Cl.
*B60H 1/34* (2006.01)
*F20F 7/00* (2006.01)
*F24F 7/00* (2006.01)

(52) U.S. Cl. .................................. 454/155; 454/315

(58) Field of Classification Search .................. 454/155
See application file for complete search history.

(56) References Cited

U.S. PATENT DOCUMENTS

| 1,602,048 | A | | 10/1926 | Seibel | |
|---|---|---|---|---|---|
| 2,746,100 | A | | 5/1956 | Nallinger | |
| 4,699,322 | A | * | 10/1987 | Jobst | 239/503 |
| 4,702,155 | A | * | 10/1987 | Hildebrand et al. | 454/155 |
| 5,947,813 | A | * | 9/1999 | Chow et al. | 454/155 |
| 6,497,616 | B2 | * | 12/2002 | Yamaguchi | 454/155 |
| 6,589,110 | B2 | * | 7/2003 | Tanabe et al. | 454/155 |
| 6,743,089 | B2 | | 6/2004 | Driller et al. | |
| 6,780,098 | B2 | * | 8/2004 | Nishida et al. | 454/155 |
| 6,805,624 | B2 | | 10/2004 | Currle et al. | |
| 6,902,474 | B2 | | 6/2005 | Gehring et al. | |
| 6,942,563 | B2 | | 9/2005 | Pesch et al. | |

* cited by examiner

*Primary Examiner* — Steve McAllister
*Assistant Examiner* — Helena Kosanovic
(74) *Attorney, Agent, or Firm* — Gifford, Krass, Sprinkle, Anderson & Citkowski, P.C.

(57) ABSTRACT

An instrument panel is provided for use in a vehicle interior. The instrument panel includes an outer surface, a vent and a step. The vent is arranged along the outer surface to direct forced air toward a specific area of a window in the vehicle. The step is formed along the outer surface of the instrument panel to promote formation of a turbulent buffer that reduces adhesion between air exiting the vent and the outer surface.

15 Claims, 2 Drawing Sheets

INSTRUMENT PANEL VENT

FIELD OF THE INVENTION

The invention relates to an instrument panel vent for an automotive vehicle. More particularly, the invention relates to an instrument panel design that reduces adhesion between air exiting the vent and an outer surface of the instrument panel.

BACKGROUND OF THE INVENTION

Vehicles typically include vents built into or formed in the instrument panel for directing forced air onto specific areas of a window or windshield in the vehicle. Modern instrument panels often have outer surfaces that are gently sloping or otherwise horizontal relative to the vents, which often results in adhesion between the air exiting the vent and the outer surface of the instrument panel. This results in air being drawn to areas other than the intended specific area of the window or windshield. Thus, it remains desirable to provide an improved design that eliminates the issue of adhesion between air exiting the vent and the outer surface of the instrument panel in order to improve the flow of air toward the intended specific area of the window or windshield in the vehicle.

SUMMARY OF THE INVENTION

According to one aspect of the invention, an instrument panel is provided for use in a vehicle interior. The instrument panel includes an outer surface, a vent and a step. The vent is arranged along the outer surface to direct forced air toward a specific area of a window in the vehicle. The step is formed along the outer surface of the instrument panel to promote formation of a turbulent buffer that reduces adhesion between air exiting the vent and the outer surface.

According to another aspect of the invention, a vehicle includes a window, a duct and an instrument panel. The duct provides forced air to be directed toward a specific area of the window. The instrument panel has a vent directing the forced air from the duct toward the specific area of a window. The instrument panel has an outer surface that extends between the vent and the specific area of the window. The instrument panel further has a step formed between the vent and the outer surface of the instrument panel, to promote formation of a turbulent buffer that reduces adhesion between air exiting the vent and the outer surface.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
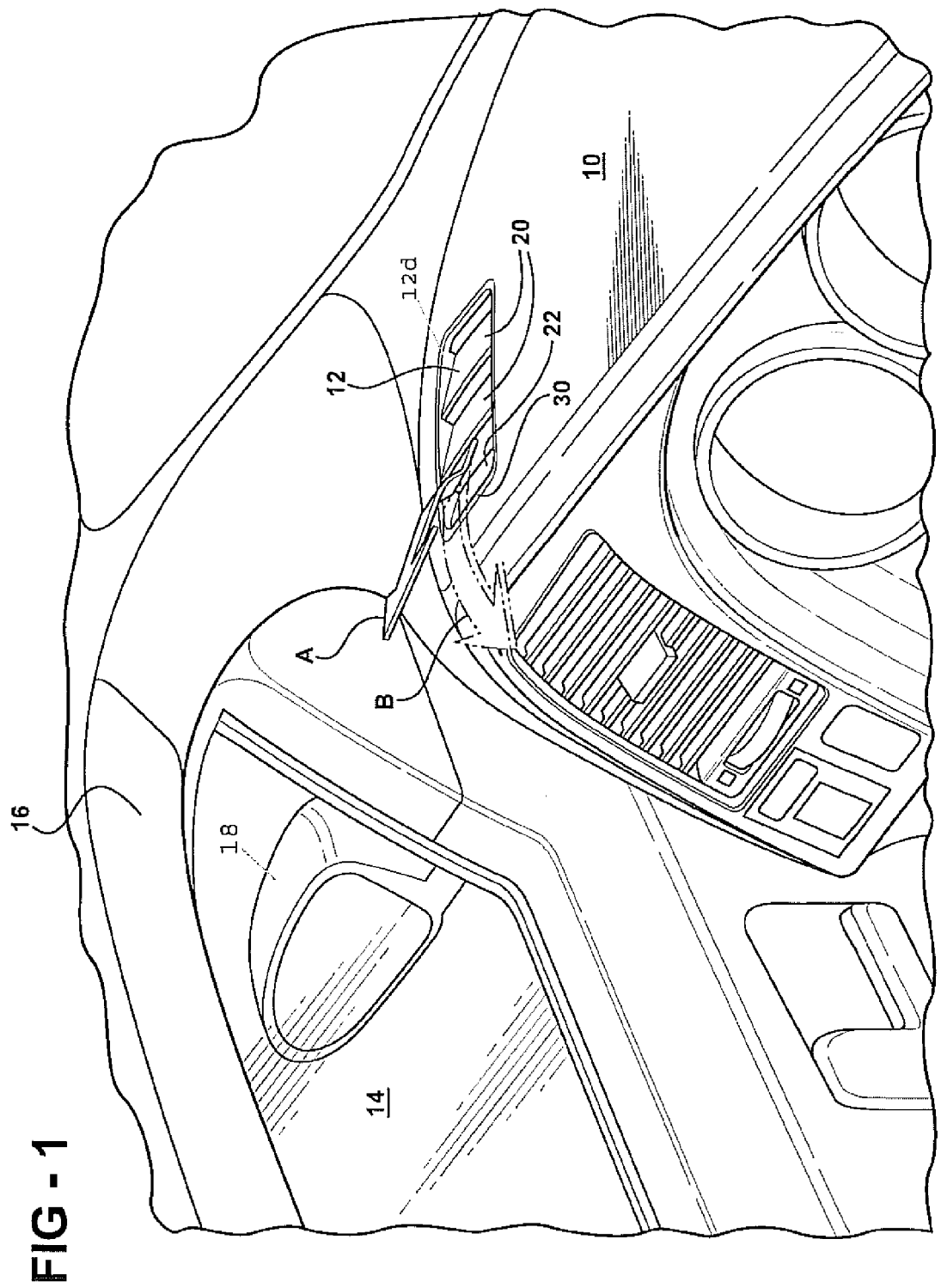
FIG. 1 is a perspective view of an interior of a vehicle illustrating an instrument panel according to one embodiment of the invention.

Referring to FIG. 1, an instrument panel is indicated at 10. The instrument panel 10 includes an air vent 12 that directs forced air toward a side window 14 of a door 16. The air vent 12 includes a lower wall 12a opposite an upper wall 12b, and a pair of opposing side walls 12c, 12b each extending between the lower and upper walls 12a, 12b so as to form an opening. The vent 12 further includes a plurality of slats 20, 22 that help to guide the air toward a targeted area of the side window 14, particularly near a side view mirror 18. Each of the slats 20, 22 has a planar surface 20a, 22a, and an upstream edge 20b, 22b opposite a downstream edge 20c, 22c. The upstream edges 20b, 22b are disposed within the air vent 12. In conventional instrument panel designs, air flow from the vent 12 will typically "adhere" or flow along a leading outer surface 24 of the instrument panel 10. Adhesion causes the air to flow generally from the exit of the vent 12 along a path, as illustrated by the arrow B, away from the targeted area of the side window 14. To reduce or eliminate adhesion between the flow of air exiting the air bent 12 and a leading outer surface 24 of the instrument panel 10, a raised lip or step 30, also referenced herein as a wall 30 is provided adjacent the vent 12. The step 30 causes the air flow to follow a desired path, as illustrated by the arrow A, toward the targeted area of the side window 14.

Figure 2:
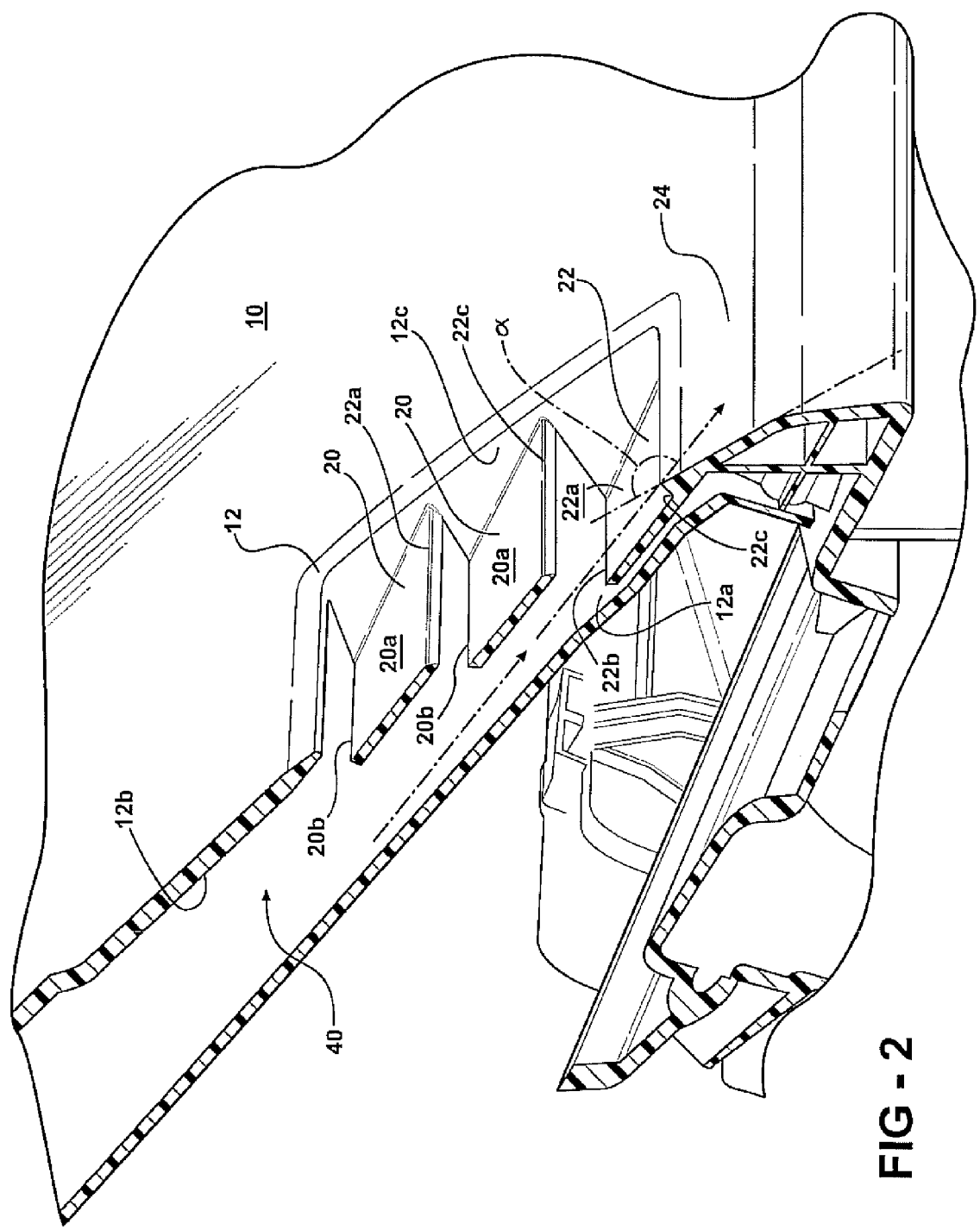
FIG. 2 is a cross sectional view of the instrument panel shown in FIG. 1.

Referring to FIGS. 1 and 2, the step 30 is raised relative to the bottom slat, also referenced herein as the end slat 22. More specifically, the end slat 22 is recessed below the lower wall of the vent 12, and the step 30 is disposed on the downstream edge 22c of the end slat 22. The step 30 interconnects the end slat 22 with the outer surface of the instrument panel, wherein a surface of the lower wall 12a of the vent 12 is substantially flush with an outer surface of the instrument panel. The step 30 operates to interfere with the air flow from the vent 12 and thereby create a turbulent buffer along the exit of the vent 12. The formation of the buffer reduces or eliminates boundary effects and surface adhesion between the air flow and the outer surface 24 of the instrument panel. The step 30 extends longitudinally along the width of the vent 12 to maximize air flow toward the targeted area of the side window 14. The height H of the step 30 is predetermined and can range between 2 mm to 4 mm relative to the bottom slat 22. The height H of the step 30 generally depends on the difference between the approach angle of a duct 40, which carries the forced air to the vent 12, and the angle of the leading outer surface 24 of the instrument panel 10, which is disposed on an opposite side of the step 30 relative to the vent 12. This difference in angle is indicated at $\alpha$ in FIG. 2. A larger angle $\alpha$ allows for a smaller step height H. Conversely, a smaller angle $\alpha$ requires a larger step height H.

Alternatively, the step may be positioned spaced apart from the vent, such that the height of the step is determined relative to the outer surface instead of the bottom slat.

In one embodiment, wherein the angle $\alpha$ is approximately 21 degrees, a step height H of approximately 3 mm results in a substantial reduction or elimination of adhesion between the air flow from the vent 12 and the leading outer surface 24 of the instrument panel 10. In general, a lip or a step along the exit of the vent 12 is desired where the angle $\alpha$ is less than approximately 26 degrees.

Although only one side of the vehicle is shown in the figures, it should be readily appreciated by those having ordinary skill in the art that the arrangement described above is applicable to both sides of the vehicle. This arrangement may also be used in other locations in the vehicle where it is desired to eliminate the effects of adhesion between the air flow exiting a vent and an adjacent outer surface in order to ensure proper air flow to a desired area of the vehicle.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

We claim:

1. An instrument panel for use in an interior of a vehicle, the vehicle having a front windshield and a pair of side windows, the instrument panel having an outer surface, the instrument panel comprising:
    a vent having a lower wall opposite an upper wall, and a pair of opposing side walls, each of the side walls extending between the lower and upper walls, the lower wall, upper wall, and side walls form an opening disposed on the outer surface of the instrument panel so as to define a duct, the duct configured to direct forced air to a specific area of one of the pair of side windows in the vehicle; and
    a plurality of slats fixedly disposed within the duct and in a fixed relationship with the opposing side walls, each of the plurality of slats is spaced apart from each other and extends between the pair of opposing side walls, each of the plurality of slats has a planar surface and an upstream edge opposite a downstream edge, the upstream edge disposed within the vent, each of the planar surfaces is parallel to the other, wherein one of the plurality of slats is an end slat, the end slat being recessed below the lower wall of the vent, and having a wall disposed on the downstream edge of the end slat and within the duct, the wall interconnecting the end slat with the lower wall of the vent wherein a surface of the lower wall of the vent is substantially flush with the outer surface of the instrument panel, the wall operable to generate a turbulent buffer of forced air so as to reduce adhesion of forced air exiting the duct to the outer surface of the instrument panel.

2. An instrument panel as set forth in claim 1, wherein the wall extends at a predetermined height relative to the planar surface of the corresponding slat.

3. An instrument panel as set forth in claim 2, wherein the predetermined height ranges between 2 mm and 4 mm.

4. An instrument panel as set forth in claim 3, wherein the duct extends at a predetermined approach angle relative to the specific area of the window.

5. An instrument panel as set forth in claim 4, wherein the difference between the approach angle and the angle of the outer surface of the instrument panel is less than 26 degrees.

6. An instrument panel as set forth in claim 1, wherein the wall extends at a predetermined height relative to the outer surface.

7. An instrument panel as set forth in claim 6, wherein the predetermined height ranges between 2 mm and 4 mm.

8. An instrument panel as set forth in claim 7, wherein the duct extends along an angle relative to the outer surface of less than 26 degrees.

9. An instrument panel as set forth in claim 8, wherein the wall extends generally between the pair of side walls of the vent.

10. A vehicle comprising:
    a front windshield and a pair of opposing side windows;
    an instrument panel having an outer surface and an opening; and
    a vent having a lower wall opposite an upper wall, and a pair of opposing side walls, each of the side walls extending between the lower and upper walls, the lower wall, upper wall, and side walls form an opening disposed on the outer surface of the instrument panel so as to define a duct, the duct configured to direct forced air to a specific area of one of the pair of side windows in the vehicle; and
    a plurality of slats fixedly disposed within the duct and in a fixed relationship with the opposing side walls, each of the plurality of slats is spaced apart from each other and extends between the pair of opposing side walls, each of the plurality of slats has a planar surface and an upstream edge opposite a downstream edge, the upstream edge disposed within the vent, each of the planar surfaces is parallel to the other, wherein one of the plurality of slats is an end slat, the end slat being recessed below the lower wall of the vent, and having a wall disposed on the downstream edge of the end slat and within the duct, the wall interconnecting the end slat with the lower wall of the vent wherein a surface of the lower wall of the vent is substantially flush with the outer surface of the instrument panel, the wall operable to generate a turbulent buffer of forced air so as to reduce the adhesion of forced air exiting the duct to the outer surface of the instrument panel.

11. A vehicle as set forth in claim 10, wherein the wall has a height of at least 2 mm.

12. A vehicle as set forth in claim 10, wherein the end slat extends at an angle of less than 26 degrees relative to the outer surface of the instrument panel.

13. A vehicle as set forth in claim 12, wherein the wall has a height of at least 2 mm relative to the outer surface.

14. A vehicle as set forth in claim 13, wherein the height of the wall extends between the planar surface of the end slat and the outer surface of the instrument panel.

15. A vehicle as set forth in claim 14, wherein the height of the wall is at least 2 mm.

* * * * *